(12) United States Patent
Garcin et al.

(10) Patent No.: US 12,030,622 B2
(45) Date of Patent: Jul. 9, 2024

(54) POWER PLANT FOR A ROTARY-WING AIRCRAFT PROVIDED WITH AN ENGINE BRAKE AS WELL AS WITH A FREE-WHEEL AND A DISENGAGEABLE CONNECTION IN PARALLEL

(71) Applicant: AIRBUS HELICOPTERS, Marignane (FR)

(72) Inventors: Patrice Garcin, Ensues (FR); Pierre Prud'homme-Lacroix, Vitrolles (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 17/528,474

(22) Filed: Nov. 17, 2021

(65) Prior Publication Data
US 2022/0169370 A1 Jun. 2, 2022

(30) Foreign Application Priority Data
Nov. 30, 2020 (FR) ...................................... 2012424

(51) Int. Cl.
*B64C 27/14* (2006.01)
*B64D 35/08* (2006.01)

(52) U.S. Cl.
CPC .............. *B64C 27/14* (2013.01); *B64D 35/08* (2013.01)

(58) Field of Classification Search
CPC ......... B64C 27/06; B64C 27/12; B64C 27/14; B64D 35/08; F16H 3/006; F16H 2003/007
See application file for complete search history.

(56) References Cited

U.S. PATENT DOCUMENTS

| | | | | |
|---|---|---|---|---|
| 4,783,023 A | * | 11/1988 | Jupe ........................ | B64C 27/12 244/6 |
| 2006/0269414 A1 | * | 11/2006 | Palcic ..................... | B64C 27/12 416/170 R |

(Continued)

FOREIGN PATENT DOCUMENTS

| EP | 2241783 A1 | 10/2010 |
|---|---|---|
| EP | 2735512 A1 | 5/2014 |

(Continued)

OTHER PUBLICATIONS

French Search Report for French Application No. FR2012424, Completed by the French Patent Office, Dated Jul. 30, 2021, 8 pages.

*Primary Examiner* — Philip J Bonzell
*Assistant Examiner* — Colin Zohoori
(74) *Attorney, Agent, or Firm* — BROOKS KUSHMAN P.C.

(57) ABSTRACT

An aircraft provided with a rotary wing driven by a mechanical kinematic linkage, the aircraft having a power plant provided with at least one engine, the mechanical kinematic linkage comprising a free-wheel associated with the engine, the free-wheel comprising a driving part and a driven part, the driving part being connected by a mechanical connection to a working shaft of the associated engine and the driven part being connected kinematically to the rotary wing. A disengageable connection is arranged in parallel with the free-wheel in order to transmit mechanical power between the rotary wing and the engine on request, the power plant having a braking system comprising an engine brake of the engine.

20 Claims, 3 Drawing Sheets

(56) References Cited

U.S. PATENT DOCUMENTS

| | | | | |
|---|---|---|---|---|
| 2009/0222178 | A1* | 9/2009 | Vialle | B64C 27/12 |
| | | | | 477/181 |
| 2010/0212326 | A1 | 8/2010 | Vialle | |
| 2012/0068007 | A1* | 3/2012 | Vialle | B64C 27/28 |
| | | | | 244/17.19 |
| 2012/0227389 | A1* | 9/2012 | Hinderks | F01L 3/02 |
| | | | | 60/317 |
| 2013/0133480 | A1* | 5/2013 | Donnelly | B60W 10/11 |
| | | | | 180/65.21 |
| 2014/0145028 | A1* | 5/2014 | Gomez | B64D 31/06 |
| | | | | 244/58 |
| 2014/0263820 | A1* | 9/2014 | Smith | B64C 27/006 |
| | | | | 244/17.19 |
| 2015/0367951 | A1* | 12/2015 | Massot | F02C 6/206 |
| | | | | 701/3 |
| 2018/0215463 | A1* | 8/2018 | Garcia | B64C 27/12 |

FOREIGN PATENT DOCUMENTS

| | | | | |
|---|---|---|---|---|
| EP | 3409977 | A1 | 12/2018 | |
| EP | 3409977 | B1 * | 2/2020 | B64C 27/12 |

\* cited by examiner

POWER PLANT FOR A ROTARY-WING AIRCRAFT PROVIDED WITH AN ENGINE BRAKE AS WELL AS WITH A FREE-WHEEL AND A DISENGAGEABLE CONNECTION IN PARALLEL

CROSS REFERENCE TO RELATED APPLICATIONS

This application claims priority to French patent application No. FR 20 12424 filed on Nov. 30, 2020, the disclosure of which is incorporated in its entirety by reference herein.

TECHNICAL FIELD

The present disclosure relates to a power plant for a rotary-wing aircraft, this power plant being provided with an engine brake as well as with a free-wheel and a disengageable connection in parallel.

BACKGROUND

A rotary-wing aircraft includes a power plant for rotating its rotary wing. The power plant comprises at least one engine connected by a mechanical kinematic linkage to the rotary wing.

The mechanical kinematic linkage comprises one free-wheel for each engine. Each free-wheel makes it possible, in particular, to automatically and functionally disconnect the rotary wing and the associated engine in the event of engine failure, for example in order to implement an autorotation flight mode.

In a single-engine aircraft, the autorotation flight mode can be engaged very quickly by means of the free-wheel. Quickly engaging this autorotation flight mode may allow the rotary wing to maintain a speed of rotation that is sufficient in order to generate the required lift. Indeed, following the engine failure, the pilot can quickly reduce the collective pitch of the blades of the rotary wing to a minimal pitch in order to switch the rotary wing to the autorotation flight mode. This minimal pitch is sometimes referred to as "low pitch". For example, the pilot moves a collective pitch lever towards a low pitch down stop. The pilot then controls the aircraft's movements by controlling a cyclic pitch component of the blades of the rotary wing.

However, and irrespective of the number of engines, the speed of rotation of the rotary wing must remain below an upper limit. Indeed, if the rotary wing rotates at too high a speed, there is a risk of the rotary wing breaking under the effect of the centrifugal force.

Under these conditions, the low pitch value is adjusted such that the speed of rotation of the autorotating rotary wing does not exceed a maximum speed of rotation during the continuation and end of gliding flight.

On a multi-engine aircraft, each engine is associated with its own free-wheel. The free-wheel associated with an inoperative engine makes it possible to functionally isolate this inoperative engine from the rotary wing. The flight can thus continue by using the engine or engines that remain in operation.

Such a power plant is therefore advantageous in the event of an engine failure both on a single-engine aircraft and on a multi-engine aircraft.

According to another aspect, a pilot may wish to perform a rapid descent to the ground, for example during a rescue operation. However, when the engine or engines are not inoperative, the free-wheel or free-wheels may limit the descent speed of the aircraft.

Indeed, if the pilot engages a rapid descent, each free-wheel functionally disconnects the associated engine from the rotary wing as soon as the speed of rotation of this self-propelled rotary wing exceeds the speed of rotation imposed by the engine or engines. The pilot then adjusts the pitch of the blades of the rotary wing not only to steer the aircraft but also to keep the speed of rotation of the rotary wing below the acceptable upper limit. These manoeuvres tend to limit, in particular, the descent speed.

According to another aspect, the components of a free-wheel are subject to wear. Following pronounced wear, a free-wheel can become liable to slip.

Documents EP 3 409 977 A1, EP 2 241 783 A1 and EP 2 735 512 A1 are known.

SUMMARY

An object of the present disclosure is therefore to propose a rotary-wing aircraft that has a power plant that aims to allow a relatively high descent speed to be achieved, for example in the context of a medical aircraft, or that is even capable of securing the power plant in the event of wear of a free-wheel.

The disclosure relates to an aircraft provided with a rotary wing driven by a mechanical kinematic linkage, said aircraft having a power plant, said power plant having at least one engine, the mechanical kinematic linkage comprising a free-wheel associated with said engine, said free-wheel comprising a driving part and a driven part, said driving part being connected by a mechanical connection to a working shaft of the associated engine and said driven part being connected kinematically to the rotary wing.

The power plant comprises a disengageable connection that is arranged in parallel with the free-wheel, the disengageable connection being disengageable on request in order to transmit mechanical power on command between the rotary wing and the engine, said power plant having a braking system comprising an engine brake of said associated engine.

The expression "mechanical connection" denotes a system mechanically connecting the engine to a free-wheel, such a system possibly comprising, for example, at least one belt, a flywheel, at least one gear, at least one shaft, etc.

The expression "in parallel" means that the disengageable connection is a mechanical device connecting the rotary wing and the engine along a different path to the internal path of the free-wheel. Such an internal path of the free-wheel runs through its connection/disconnection link, such a link comprising rollers and ramps, for example.

The expression "disengageable connection" denotes a system comprising a device that can be connected or disconnected following an external intervention, on the order of a pilot operating a human-machine interface or a controller when predetermined conditions are met, unlike a free-wheel depending only on the speeds of rotation of the driving part and the driven part. The disengageable connection may further include at least one gear, at least one shaft, etc.

The expression "associated engine" denotes the engine connected to the driving part of a particular free-wheel. Indeed, in the presence of several engines, each engine can cooperate with its own free-wheel.

Thus, for one or even each free-wheel, a disengageable connection for direct power transmission may be arranged in parallel with this free-wheel between the associated engine and the rotary wing. In addition, each disengageable connection is associated with a braking system cooperating, in particular, with the associated engine. One or more braking systems therefore is respectively provided for the disengageable connection or connections, in particular being configured to control the speed of rotation of the rotary wing when the corresponding disengageable connection or connections are in an engaged mode. In particular, the braking system or systems and the disengageable connection or connections are made active when the associated free-wheel is slipping and/or during a descending flight phase and/or in the event of overspeed of the rotary wing and, for example, during a descending flight phase carried out at a vertical speed higher than a speed threshold.

During a conventional operating phase, for example during a level flight phase, the disengageable connection or connections are switched to a disengaged mode. The engine or engines are connected functionally to the rotary wing by one or more respective free-wheels.

However, a pilot may control the pitch of the blades of the rotary wing in order to perform a rapid descent, for example in order to rescue an individual following an accident. With a conventional aircraft, the free-wheel or free-wheels are disengaged and no longer transmit torque once said speed threshold has been passed, and the speed of rotation of the rotary wing then runs the risk of exceeding an upper rotational speed limit. According to the disclosure, the disengageable connection or connections are switched to an engaged mode in order to transmit torque between the rotary wing and the engine or engines. The braking system or systems are then used to control the speed of rotation of the rotary wing by means of at least one engine brake. For example, the braking system or systems are controlled by a controller in order to control the speed of rotation of the rotary wing towards a stored speed setpoint. By way of illustration, the descent speed may then, for example, be of the order of 1.5 times to 2 times the descent speed that can be reached by a conventional rotary-wing aircraft, without the speed of rotation of the rotary wing exceeding the upper rotational speed limit.

Using a braking system with engine braking has the advantage of facilitating the implementation of the disclosure.

Furthermore, in the event that slipping is detected in a free-wheel, the disengageable connection arranged in parallel with this free-wheel may possibly be positioned in the engaged mode in order to compensate for the faulty free-wheel. The same can apply in the event of overspeed of the rotary wing.

The aircraft may also include one or more of the following features.

According to an optional feature, said free-wheel may comprise a connection/disconnection link arranged between the driving part and the driven part, the connection/disconnection link constraining the driving part and the driven part in rotation in an engaged mode.

According to an optional feature compatible with the preceding feature and in accordance with a first arrangement variant, the mechanical kinematic linkage may comprise a gearbox provided with an engine input connected to said driven part, said disengageable connection being able to be arranged between the associated engine and a dedicated input of the gearbox.

This first variant consists in creating a new line for transmitting power between the engine and the new input of the gearbox. Indeed, the dedicated input is a mechanical input different from the standard engine input.

The disengageable connection can be sized to have the same speed reduction factor as the connection comprising the associated free-wheel.

The disengageable connection can be sized to transmit an engine torque from the rotary wing to the engine equal to the engine torque generated by the associated engine when a particular engine speed is applied. For example, this particular engine speed is the speed during which the engine can generate the power referred to by a person skilled in the art as "maximum continuous power".

According to a second arrangement variant, said disengageable connection can be arranged between said driving part and a connecting shaft of said driven part.

A piece of equipment may comprise a free-wheel with an integrated clutch. This second variant has the advantage of not requiring a gearbox to be modified in order to implement the disclosure. This second variant is particularly advantageous in the context of using an engine driving the free-wheel via a belt.

According to an optional feature compatible with the preceding features and irrespective of the possible arrangement variant, the disengageable connection may comprise at least one clutch disk that is able to move in translation and a clutch actuator that is configured to move said clutch disk in translation between a disengaged position assumed in a disengaged mode and an engaged position assumed in an engaged mode.

The disengageable connection may thus comprise a clutch provided with a clutch disk. The disengageable connection may include at least one flat, conical or other disk, and the disengageable connection may have a plurality of clutch disks.

By default, the clutch actuator may, for example, place the disengageable connection in the disengaged mode by placing the clutch disk in its disengaged position. On the other hand, the clutch actuator may place the disengageable connection in the engaged mode during a rapid descent or in the event of the free-wheel slipping, for example, by moving the clutch disk to its engaged position.

According to the second variant, the clutch disk may be able to move in translation either so as to be pressed against a contact face of the driving part in the engaged mode, or so as to be moved away from the contact face in the disengaged mode.

According to an optional feature compatible with the preceding features and irrespective of the possible arrangement variant, said aircraft may comprise a clutch controller in communication with said disengageable connection via a communication link, said clutch controller communicating with at least one monitoring sensor and being configured to place said disengageable connection in a disengaged mode or an engaged mode depending on a monitoring signal emitted by said at least one monitoring sensor.

For example, said at least one monitoring sensor may comprise a sensor for detecting a descending flight phase.

Optionally, such a sensor for detecting a descending flight phase may comprise a vertical speed sensor. The clutch controller then determines if the vertical speed is lower than a stored threshold, and a descending flight phase is detected when the vertical speed is lower than this stored threshold.

According to another example, a sensor for detecting a descending flight phase may comprise a sensor determining whether an order to descend is sent, for example an antenna receiving a command sent remotely, in the context of a drone. A flight controller may then be configured to first transmit a signal to the clutch controller in order to command the disengageable connection to switch to the engaged mode, and then, after a few seconds if necessary, to command the descent as such in a conventional manner.

According to another example, a sensor for detecting a descending flight phase may comprise an interface that can be activated by a pilot. This interface may transmit a signal to the clutch controller in order to command the disengageable connection to switch to the engaged mode.

For example, said at least one monitoring sensor may comprise a sensor for measuring slip in said free-wheel.

Such a sensor for measuring slip in said free-wheel may include an upstream sensor measuring a speed of rotation of the driving part, directly or indirectly, on a member constrained to rotate with the driving part, and a downstream sensor measuring a speed of rotation of the driven part, directly or indirectly, on a member constrained to rotate with the driven part. A significant amount of slip can cause the rotational speeds of the driving part and the driven part of a free-wheel to become desynchronized. The clutch controller can then compare the measurements taken in order to determine whether the free-wheel is slipping.

For example, said at least one monitoring sensor may comprise a speed sensor for detecting overspeed of the rotary wing.

Such a sensor may comprise a sensor measuring a speed of rotation of a member that moves in rotation together with the rotary wing, for example a rotor mast. Therefore, the clutch controller may comprise a comparator comparing the speed of rotation with an overspeed threshold, in order to place the disengageable connection in the engaged mode when the measured speed of rotation is higher than the overspeed threshold, so as to make the braking system active.

According to an optional feature compatible with the preceding features and irrespective of the possible arrangement variant, said aircraft may comprise a braking controller in communication with said braking system, said braking controller communicating with at least one speed sensor emitting a speed signal as a function of a speed of rotation of the rotary wing, said braking controller being configured to control said speed of rotation of the rotary wing depending on the speed signal.

If applicable, the braking controller and the clutch controller may be sub-assemblies of the same controller. For example, the braking controller and the clutch controller represent two different code segments of the same controller.

According to an optional feature compatible with the preceding features and irrespective of the possible arrangement variant, said engine being able to emit exhaust gases, said engine brake may comprise a valve for controlling an exhaust gas flow rate, the valve for controlling an exhaust gas flow rate being controlled by a control actuator.

When rapid descent is not taking place, the control valve may be in a first position maximizing the passage surface area of the exhaust gases. On the other hand, during rapid descent, the control valve can be moved to at least reduce this passage surface area in order to brake the engine by at least partially blocking the exhaust gases. The position of the control valve is, for example, adjusted depending on the speed of rotation of the rotary wing.

If the engine is a turbocharged engine and therefore provided with a turbocharger, the control valve may be arranged on an exhaust line upstream of the turbocharger in a direction of flow of the exhaust gases. This arrangement may make it possible to avoid subjecting the turbocharger to the overpressure resulting from braking obtained by closing the control valve.

According to an optional feature compatible with the preceding features and irrespective of the possible arrangement variant, said engine brake may comprise an exhaust relief valve.

Using an exhaust relief valve may help prevent pneumatic effects in the engine when the control valve is used, for example.

According to an optional feature compatible with the preceding features and irrespective of the possible arrangement variant, said mechanical kinematic linkage possibly comprising a gearbox provided with an engine input connected to said driven part, said braking system comprises an additional brake arranged on a member mechanically interposed between the associated engine and the gearbox.

The engine brake may thus be supplemented by another brake arranged between the engine and the rotary wing in order to achieve better braking if necessary. Such an additional brake may be in the form of a disk wheel brake, an eddy current brake, a Froude brake using air as fluid, etc.

According to an optional feature compatible with the preceding features and irrespective of the possible arrangement variant, said at least one engine possibly comprising several engines, said power plant may comprise one engine braking system for each engine, each engine cooperating with a free-wheel that is specific to it and a connection referred to as a disengageable connection that is specific to it.

In addition to an aircraft, the disclosure relates to a method that can be implemented by such an aircraft.

Thus, the disclosure relates to a method for optimizing a descent speed of an aircraft provided with a rotary wing driven by a mechanical kinematic linkage, said aircraft having a power plant, said power plant having at least one engine, the mechanical kinematic linkage comprising a free-wheel associated with said engine, said free-wheel comprising a driving part and a driven part, said driving part being connected by a mechanical connection to a working shaft of the associated engine and said driven part being connected kinematically to the rotary wing.

This method comprises the following steps:
positioning, in an engaged mode, a disengageable connection that is arranged in parallel with the free-wheel and that is configured to transmit mechanical power between the rotary wing and the associated engine in this engaged mode; and controlling a speed of rotation of said rotary wing by braking with a braking system comprising an engine brake of said associated engine.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

Figure 1:
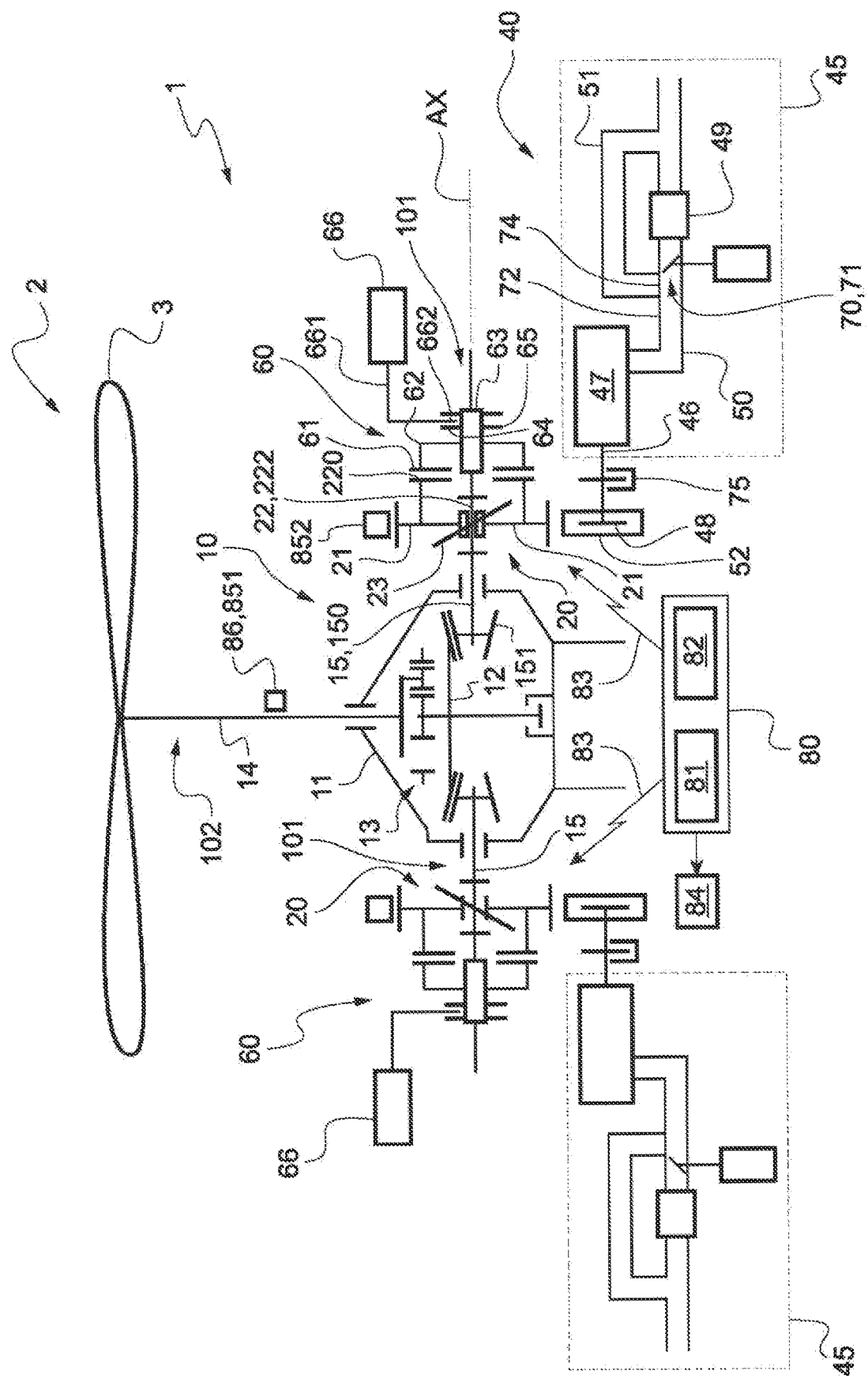
FIG. 1 is a view of an aircraft according to the disclosure.

FIG. 1 shows an example of an aircraft 1 according to the disclosure. This aircraft 1 may be a rotorcraft such as a helicopter or the like. This aircraft 1 may be an aircraft having a pilot on board, or may be a drone. This aircraft 1 is shown in the form of a diagram so as not to unduly clutter the figures.

Irrespective of these aspects, the aircraft 1 comprises a rotary wing 2 provided with a plurality of blades 3. The pitch of the blades 3 may be controlled cyclically and collectively, by a human pilot who may or may not be on board, or indeed by an autopilot system, in a conventional manner.

In order to rotate the rotary wing 2, the aircraft 1 includes a power plant 40 that is, in particular, connected to the rotary wing 2 by a mechanical kinematic linkage 10.

Figure 3:
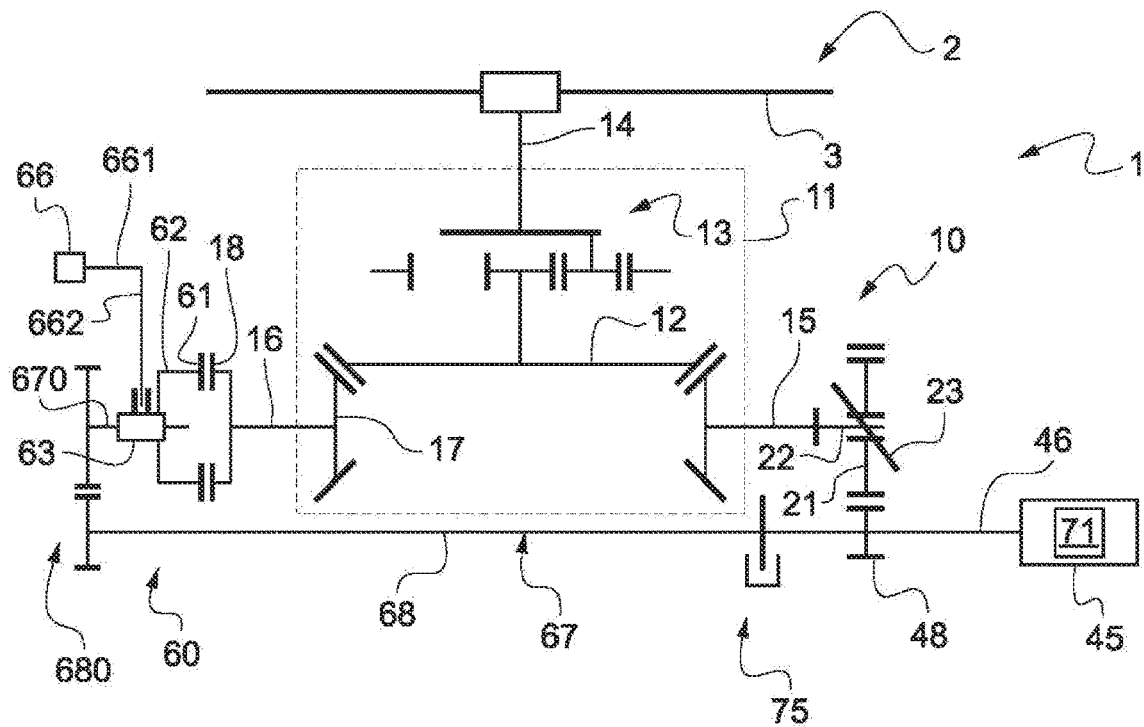
FIG. 3 is a view of an aircraft according to the disclosure.
Figure 4:
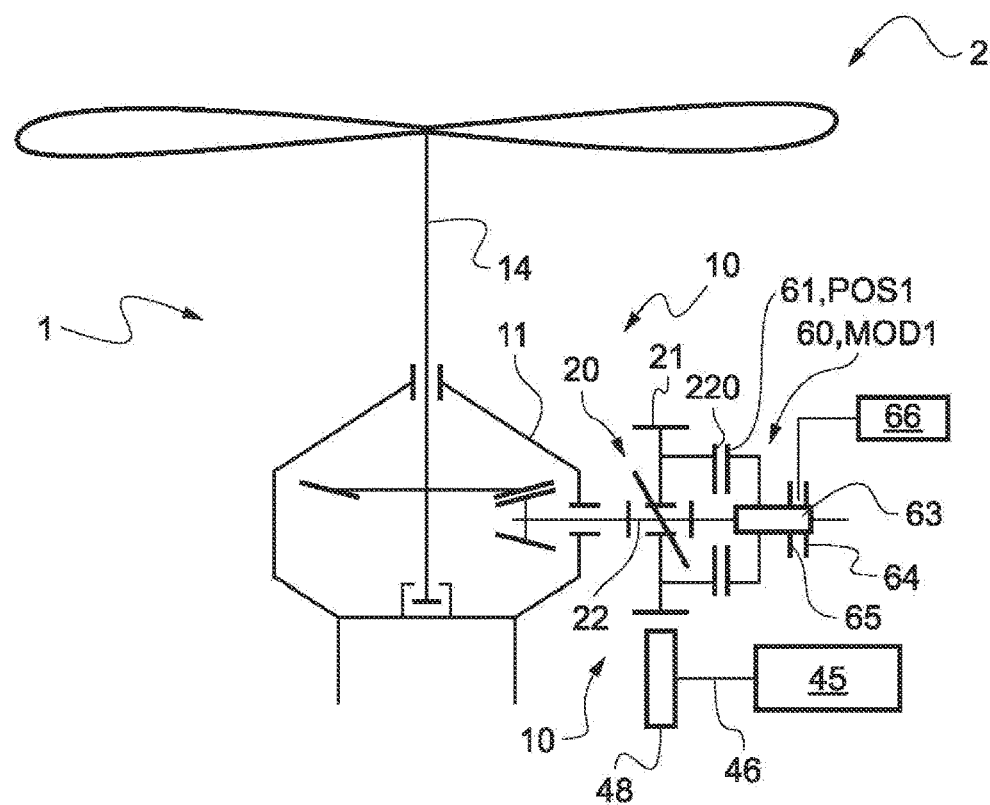
FIG. 4 is a view showing the method of the disclosure, showing an aircraft having a disengageable connection in the disengaged mode.
Figure 5:
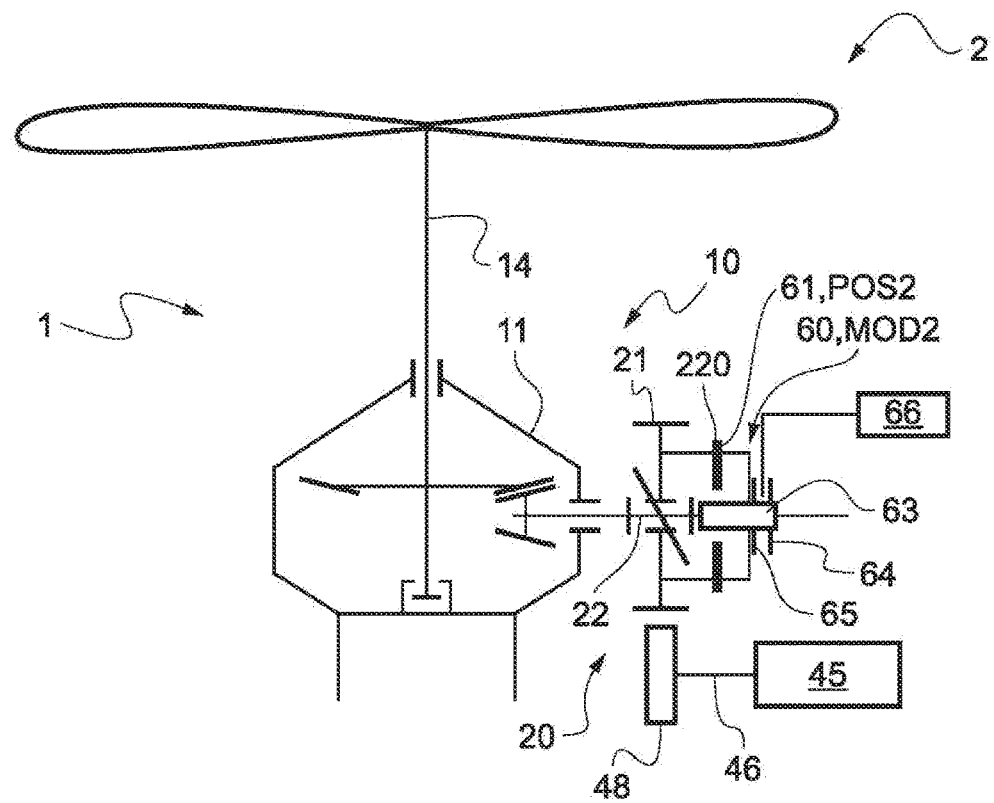
FIG. 5 is a view showing the method of the disclosure, showing an aircraft having a disengageable connection in the engaged mode.

This power plant 40 is thus provided with at least one engine 45. FIG. 1 shows an example comprising two engines 45, while FIGS. 3 to 5 show examples having a single engine 45. It is possible to have more than two engines 45, if necessary. The mechanical kinematic linkage 10 may include a first section 101 for each engine 45, the first section or sections 101 being connected to a second section 102 that sets the rotary wing 2 in motion.

According to the example shown, the second section 102 comprises a gearbox 11 comprising a rotor mast 14 rotating the rotary wing 2. For example, the gearbox 11 has one engine input 15 for each engine. At least one or indeed each engine input 15 optionally comprises a shaft 150 carrying a pinion 151 that meshes with a summing gear 12. The summing gear 12 may drive the rotor mast 14 directly or indirectly via at least one epicyclic speed reduction stage 13.

For at least one or indeed more than one or each engine 45 according to FIG. 1, the first associated section 101 of the mechanical kinematic linkage 10 comprises a free-wheel 20 associated with this engine 45.

Such a free-wheel 20 is provided with a driving part 21. The driving part 21 is connected by a mechanical connection to a working shaft 46 of the associated engine 45.

The engine 45 may be a piston engine. The engine 15 may be provided with a crankshaft forming said working shaft 46.

According to the example shown, the working shaft 46 may carry a flywheel 48 driving a belt 52 which meshes with the driving part 21. The working shaft may drive the driving part 21 in a different manner, for example via gears.

Furthermore, the free-wheel 20 is provided with a driven part 22. The driven part 22 is kinematically connected to the rotary wing 2. For example, the driven part 22 comprises a shaft 222 that is secured, in a typical manner, to an engine input 15 of the gearbox 11.

The driving part 21 may be a one-piece component or may comprise several components secured together. The driven part 22 may be a one-piece component or may comprise several components secured together. At least one section of the driving part 21 or of the driven part 22 may be rotationally symmetrical with respect to the axis of rotation of the free-wheel 20.

According to one positioning variant that is shown, the driving part 21 may be located radially at least partially around the driven part 22.

Moreover, when stationary or as long as the driven part 22 is rotating faster than the driving part 21 about an axis of rotation, the free-wheel 20 is in an operating mode referred to, for convenience, as the "desynchronized" or "disengaged" operating mode. The driving part 21 does not transmit engine torque to the driven part 22 and vice versa. The driven part 22 and the driving part 21 are rotationally disengaged from each other about the axis of rotation.

Conversely, in an operating mode referred to as the "synchronized" or "engaged" operating mode, the driving part 21 and the driven part 22 rotate together at the same speed about the axis of rotation, except in the event of failure. The driving part 21 transmits engine torque to the driven part 22.

To this end, the free-wheel 20 comprises a connection/disconnection link 23 arranged between the driving part 21 and the driven part 22 for linking the driving part 21 and the driven part 22 in rotation about the axis of rotation AX during the engaged mode, and for rotationally disengaging the driving part 21 and the driven part 22 about the axis of rotation AX during the disengaged mode.

The connection/disconnection link 23 therefore automatically constrains the driving part 21 and the driven part 22 in rotation, i.e., without any external intervention, as long as the driven part 22 and the driving part 21 are rotating at the same speed.

Figure 2:
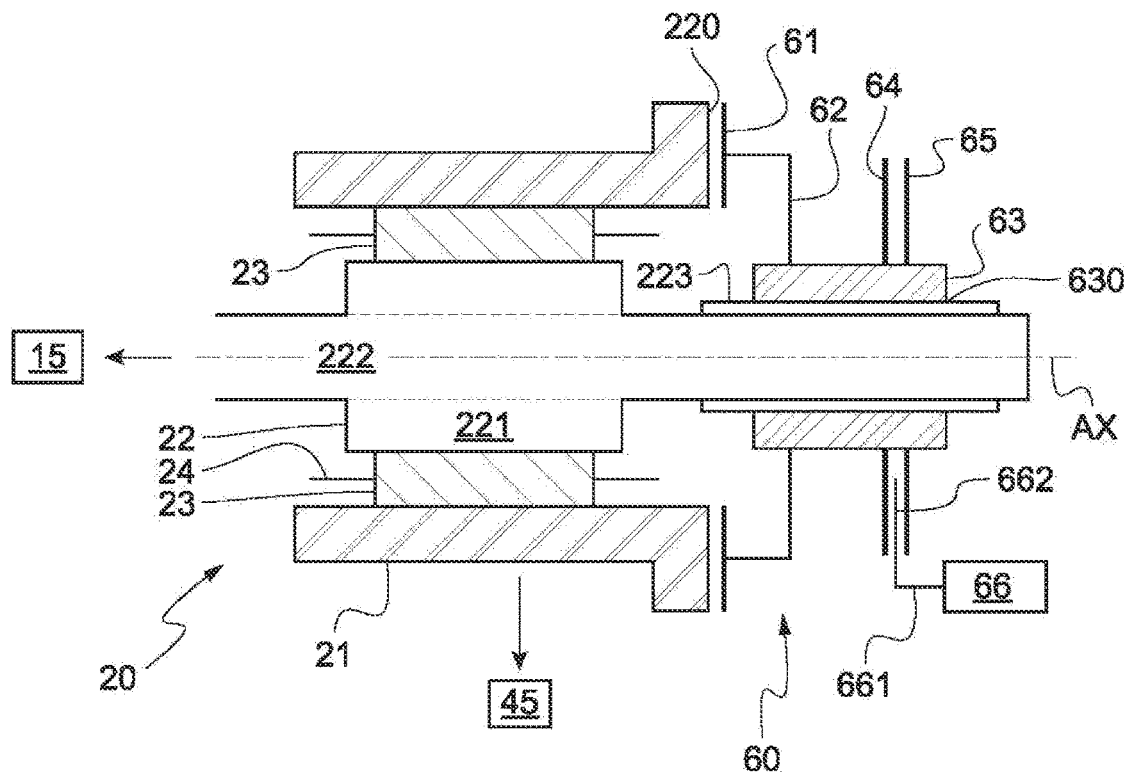
FIG. 2 is a cross-sectional view of a disengageable connection.

For example, the connection/disconnection link 23 comprises a plurality of rollers that may each be arranged in a cage 24 shown in FIG. 2. The rollers are arranged radially between respective ramps 221 and a cylindrical face. For example, the ramps 221 are secured to the shaft 222 of the driven part 22 and the cylindrical face belongs to the driving part 21. According to another embodiment, the free-wheel may comprise wheels, at least one pawl, etc.

Moreover, for at least one engine 45 and regardless of the number of engines 45, the power plant 40 comprises a disengageable connection 60 and a braking system 70.

According to the example of FIG. 1, when several engines 45 are present, the power plant 40 may have one braking system 70 for each engine 45, each engine 45 cooperating with a free-wheel 20 that is specific to it and with a disengageable connection 60 that is specific to it.

When several engines 45 are present, it is also possible for at least one of the engines not to be associated with a disengageable connection and with a braking system.

Irrespective of this aspect, the disengageable connection 60 of an engine 45 is arranged functionally in parallel with the free-wheel 20, being configured to transmit or not transmit mechanical power between the rotary wing 2 and the engine 45 on request.

Such a disengageable connection 60 may include a clutch. This clutch may, for example, comprise at least one clutch disk 61 that is able to move in translation, along an axis of translation, in order to rigidly connect the rotary wing and the working shaft 46 of the engine 45 only when predetermined conditions are met. Moreover, the disengageable connection 60 has a clutch actuator 66 controlling the clutch. This clutch actuator 66 is connected to the clutch disk 61 by various components in order to move said clutch disk 61 in translation between a disengaged position in which the clutch disk 61 is free and an engaged position in which the clutch disk 61 is rigidly connected by friction to another component of the mechanical kinematic linkage 10. For example, such a clutch actuator 66 may be in the form of a linear actuator, for example an electric or hydraulic actuator.

According to one example, the clutch of the disengageable connection 60 may include a presser 62 that carries the clutch disk 61. The presser 62 is carried by a slide 63 constrained to rotate with a drive shaft about the axis of translation. In addition, the slide 63 is able to move in translation along this drive shaft. Consequently, the clutch actuator 66 may, for example, be a linear actuator provided with a control rod 661 that is able to move in translation. This control rod 661 may be integral in translation with the slide 63, the slide 63 nevertheless comprising a degree of freedom to rotate about the axis of translation with respect to the control rod 661. For example, this control rod 661 may be angled and/or comprise an end 662 that extends, radially with respect to the axis of translation according to the example, into a slot of the slide 63. This slot may be provided between two annular stops 64, 65 of the slide 63.

According to the second arrangement variant of FIG. 1, such a disengageable connection 60 can be arranged between the driving part 21 of the associated free-wheel 20 and a connecting shaft 222 of the driven part 22.

FIG. 2 shows an example of such a disengageable connection 60. The clutch disk 61 is able to move in translation along an axis of translation that coincides with the axis of rotation AX of the free-wheel 20. In an engaged position, the clutch disk 61 is pressed against a contact face 220 of the driving part 21. In a disengaged position, the clutch disk 61 is moved away from the contact face 220. The slide 63 may comprise straight splines 630 cooperating with matching splines 223 of the connecting shaft 222 of the free-wheel 20. Thus, the slide 63 moves in rotation about the axis of rotation AX together with the driven part 22 of the free-wheel, but is able to move in translation along the axis of rotation AX relative to the driven part 22.

According to the first arrangement variant of FIG. 3, such a disengageable connection 60 of an engine 45 can be arranged between the engine 45 and a dedicated input 16 of the gearbox 11. This dedicated input 16 may, for example, comprise a shaft extending from a pinion 17 that may, for example, be meshed with the summing gear 12, to a ring 18.

In the example shown, the working shaft 46 of the engine 45 may be extended by a link 67 leading to a disengageable connection 60. The disengageable connection 60 includes a clutch disk 61 that can be pressed against a bearing face of the ring 18 of the dedicated input 16.

For example, the disengageable connection 60 may be of the type described above. The slide 63 may comprise straight splines cooperating with matching splines of a shaft 670 of the link 67. According to the example shown, this shaft 670 is connected by at least one gear 680 to a shaft 68 set in motion by the engine 45.

The slide 63 is also able to move in translation relative to this shaft 670 along an axis of translation, and is able to rotate about this axis of translation together with this shaft 670.

Irrespective of the arrangement variant and the way in which a disengageable connection 60 is established, FIG. 1 shows an aircraft 1 that comprises a clutch controller 81 for controlling the disengageable connection or connections 60.

The term "controller" denotes a processing unit that may comprise, for example, at least one processor and at least one memory, at least one integrated circuit, at least one programmable system, or at least one logic circuit, these examples not limiting the scope given to the expression "controller". The term "processor" may refer equally to a central processing unit (CPU), a graphics processing unit (GPU), a digital signal processor (DSP), a microcontroller, etc.

The clutch controller 81 may comprise a single unit, or even several units that can communicate with each another, for example.

The clutch controller 81 may be part of a general controller 80 that is able to perform other functions.

The aircraft 1 thus comprises a communication link 83, which may be wired or wireless, placing the clutch controller 81 in communication with the disengageable connection or connections 60 and, in particular, with the clutch actuator or actuators 66.

In order to control the clutch actuator or actuators 66, the aircraft 1 may include at least one monitoring sensor 84, 85 transmitting at least one signal to the clutch controller 81.

The clutch controller 81 is then configured to place the disengageable connection 60 in the disengaged mode or the engaged mode depending on stored instructions and the monitoring signal emitted by the monitoring sensor or sensors 84, 85.

Consequently, at least one monitoring sensor may include a sensor 84 for detecting a descending flight phase and/or at least one monitoring sensor may include a sensor 85 for measuring slip in said free-wheel 20.

A sensor 84 for detecting a descending flight phase can, for example, comprise a conventional vertical speed sensor, a sensor determining the emission of an order to descend, a sensor determining a request made via a human-machine interface, etc.

A sensor 85 for measuring slip in said free-wheel 20 may comprise a sensor for sensing a speed of rotation upstream of the free-wheel 20, for example a sensor 852 for sensing the speed of rotation of the driving part, and a sensor for sensing a speed of rotation downstream of the free-wheel 20, for example a sensor 851 for sensing the speed of rotation of the rotor mast.

Irrespective of the aspects described above, for each disengageable connection 60 cooperating with an engine 45, the power plant 40 includes a braking system 70. The braking system associated with a disengageable connection 60 comprises at least one engine brake 71 of the corresponding engine 45.

Optionally, a braking controller 82 is in communication with the braking system 70 via a wired or wireless link. The braking controller 82 may comprise a single unit, or even several units that can communicate with each another, for example. The braking controller 82 may be part of a general controller 80 that is able to perform other functions.

In order to control the braking system 70 of a disengageable connection 60, the braking controller 82 communicates with at least one speed sensor 86. This speed sensor 86 emits a speed signal as a function of a speed of rotation of the rotary wing 2. The speed sensor 86 may be of a conventional type, comprising, for example, a position sensor and a derivator or an accelerometer and an integrator. The speed sensor 86 may also act as a monitoring sensor.

Consequently, the braking controller 82 can be configured to control said speed of rotation of the rotary wing 2, by actuating the braking system 70 and, in particular, the engine brake 71, depending on the speed signal received.

For example, the engine brake 71 may include a control valve 72 for controlling an exhaust gas flow rate within an exhaust gas line 50. The valve 72 for controlling an exhaust gas flow rate has a position that can be adjusted by a control actuator 73 controlled by the braking controller 82. If applicable, the valve 72 for controlling an exhaust gas flow rate may be arranged upstream of a turbine of a turbocharger 49.

The engine brake 71 may optionally include an exhaust relief valve 74 controlled by an actuator that is not shown here controlled by the braking controller 82. This exhaust relief valve 74 may be arranged on a discharge line 51 bypassing the turbocharger 49. This exhaust relief valve 74 may be arranged upstream of the valve 72 for controlling an exhaust gas flow rate.

Optionally, the braking system 70 may also include an additional brake 75 arranged on a component, for example a shaft, suitable for rigidly connecting the associated engine 45 and the rotary wing 2 when the disengageable connection 60 is in the engaged mode.

According to FIG. 1, a disk brake 75 may for example be arranged on the working shaft 46. According to the example of FIG. 3, a disk brake 75 is arranged on a shaft 68 of the link connecting the working shaft 46 to the disengageable connection 60.

FIGS. 4 and 5 show the method of the disclosure.

With reference to FIG. 4, in normal flight conditions, each disengageable connection 60 is positioned in its disengaged position POS1 during the disengaged mode MOD1. The disengageable connection 60 does not transmit any engine torque. The free-wheel 20 operates in a conventional manner on a helicopter.

If a pilot wishes to carry out a rapid descent detected, for example, with the sensor 84 for detecting a descending flight phase, or if slip is detected in the free-wheel 20 with the sensor 85 for measuring slip in said free-wheel 20, or indeed if the speed of rotation measured by the speed sensor exceeds a threshold, the method includes a step of positioning a disengageable connection 60 in an engaged mode MOD2, shown in FIG. 5.

For example, the clutch controller 81 controls one or more clutch actuators 66 to move at least one clutch disk 61 to its engaged position, possibly depending on a signal emitted by one of the monitoring sensors.

If the rotary wing 2 tends to rotate faster than the working shaft 46, the disengageable connection 60 transmits power from the rotary wing 2 to the engine 45.

The method therefore includes a step of controlling the speed of rotation of the rotary wing 2 by braking with the braking system 70.

The engine brake 71 of the engine 45 and possibly an additional brake 75 may be activated by the braking controller 82 in order to keep the speed of rotation of the rotary wing 2 below an upper limit, for example by making this speed of rotation tend towards a stored setpoint.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure and the claims.

What is claimed is:

1. An aircraft provided with a rotary wing driven by a mechanical kinematic linkage, the aircraft having a power plant, the power plant having at least one engine, the mechanical kinematic linkage comprising a free-wheel associated with the engine, the free-wheel comprising a driving part and a driven part, the driving part being connected by a mechanical connection to a working shaft of the associated engine and the driven part being connected kinematically to the rotary wing, the power plant comprising a disengageable connection that is arranged in parallel with the free-wheel, the disengageable connection being disengageable on request in order to transmit mechanical power on command between the rotary wing and the engine, wherein the disengageable connection comprises a clutch located directly between the driving part and a connecting shaft of the driven part, the power plant having a braking system comprising an engine brake of the engine.

2. The aircraft according to claim 1
wherein the free-wheel comprises a connection/disconnection link arranged between the driving part and the driven part, the connection/disconnection link constraining the driving part and the driven part in rotation in an engaged mode.

3. The aircraft according to claim 1
wherein the aircraft comprises a clutch controller in communication with the disengageable connection via a communication link, the clutch controller communicating with at least one monitoring sensor and being configured to place the disengageable connection in a disengaged mode or an engaged mode depending on a monitoring signal emitted by the at least one monitoring sensor.

4. The aircraft according to claim 3
wherein the at least one monitoring sensor comprise a sensor for detecting a descending flight phase.

5. The aircraft according to claim 3
wherein the at least one monitoring sensor comprise a sensor for measuring slip in the free-wheel.

6. The aircraft according to claim 3
wherein the at least one monitoring sensor comprise a speed sensor for detecting overspeed of the rotary wing.

7. The aircraft according to claim 1
wherein the aircraft comprises a braking controller in communication with the braking system, the braking controller communicating with at least one speed sensor emitting a speed signal as a function of a speed of rotation of the rotary wing, the braking controller being configured to control the speed of rotation of the rotary wing depending on the speed signal.

8. The aircraft according to claim 1
wherein, the engine emitting exhaust gases, the engine brake comprises a valve for controlling an exhaust gas flow rate, the valve for controlling an exhaust gas flow rate being controlled by a control actuator.

9. The aircraft according to claim 1
wherein the engine brake includes an exhaust relief valve.

10. The aircraft according to claim 1
wherein, the mechanical kinematic linkage including a gearbox provided with an engine input connected to the driven part, the braking system comprises an additional brake arranged on a member mechanically interposed between the associated engine and the gearbox.

11. The aircraft according to claim 1
wherein, the at least one engine comprising several engines, the power plant has one braking system for each engine, each engine cooperating with a free-wheel that is specific to it and with a so-called disengageable connection that is specific to it.

12. An aircraft provided with a rotary wing driven by a mechanical kinematic linkage, the aircraft having a power plant, the power plant having at least one engine, the mechanical kinematic linkage comprising a free-wheel associated with the engine, the free-wheel comprising a driving part and a driven part, the driving part being connected by a mechanical connection to a working shaft of the associated engine and the driven part being connected kinematically to the rotary wing, the power plant comprising a disengageable connection that is arranged in parallel with the free-wheel, the disengageable connection being disengageable on request in order to transmit mechanical power on command between the rotary wing and the engine, wherein the disengageable connection is arranged between the driving part and a connecting shaft of the driven part, the power plant having a braking system comprising an engine brake of the engine;

wherein the disengageable connection comprises at least one clutch disk that is able to move in translation and a clutch actuator that is configured to move the clutch disk in translation between a disengaged position assumed in a disengaged mode and an engaged position assumed in an engaged mode; and wherein the clutch disk is able to move in translation either so as to be pressed against a contact face of the driving part in the engaged mode or so as to be moved away from the contact face in the disengaged mode.

13. The aircraft according to claim 12
wherein the free-wheel comprises a connection/disconnection link arranged between the driving part and the driven part, the connection/disconnection link constraining the driving part and the driven part in rotation in an engaged mode.

14. The aircraft according to claim 12
wherein the aircraft comprises a clutch controller in communication with the disengageable connection via a communication link, the clutch controller communicating with at least one monitoring sensor and being configured to place the disengageable connection in a disengaged mode or an engaged mode depending on a monitoring signal emitted by the at least one monitoring sensor.

15. The aircraft according to claim 14
wherein the at least one monitoring sensor comprise at least one of a sensor for detecting a descending flight phase, a sensor for measuring slip in the free-wheel, or a speed sensor for detecting overspeed of the rotary wing.

16. The aircraft according to claim 12
wherein the aircraft comprises a braking controller in communication with the braking system, the braking controller communicating with at least one speed sensor emitting a speed signal as a function of a speed of rotation of the rotary wing, the braking controller being configured to control the speed of rotation of the rotary wing depending on the speed signal.

17. The aircraft according to claim 12
wherein the engine brake includes an exhaust relief valve.

18. An aircraft having a rotary wing drivable by a mechanical kinematic linkage, the aircraft having a power plant having at least one engine, the mechanical kinematic linkage comprising a free-wheel associated with the engine, the free-wheel comprising a driving part and a driven part, the driving part mechanically connected to a working shaft of the associated engine and the driven part being kinematically connected to the rotary wing, the power plant comprising a disengageable connection arranged in parallel with the free-wheel and being selectively disengageable to transmit mechanical power on command between the rotary wing and the engine, the disengageable connection comprises a clutch disposed directly between and directly connecting the driving part and the driven part, the power plant having a braking system comprising an engine brake of the engine.

19. The aircraft according to claim 18
wherein the clutch of the disengageable connection comprises at least one clutch disk able to move in translation and a clutch actuator configured to move the clutch disk in translation between a disengaged position and an engaged position.

20. The aircraft according to claim 19
wherein the clutch disk is able to move in translation either so as to be pressed against a contact face of the driving part in the engaged position or so as to be moved away from the contact face in the disengaged position.

\* \* \* \* \*